United States Patent [19]

Watanabe

[11] Patent Number: 5,648,181

[45] Date of Patent: Jul. 15, 1997

[54] INORGANIC THIN FILM ELECTROLUMINESCENT DEVICE HAVING A LIGHT EMISSION LAYER

[75] Inventor: Masao Watanabe, Minamiashigara, Japan

[73] Assignee: Fuji Xerox Co., Ltd., Tokyo, Japan

[21] Appl. No.: 563,358

[22] Filed: Nov. 28, 1995

Related U.S. Application Data

[63] Continuation of Ser. No. 118,199, Sep. 9, 1993, abandoned.

[30] Foreign Application Priority Data

Sep. 14, 1992 [JP] Japan .................................. 4-269081

[51] Int. Cl.⁶ .................................................. B32B 18/00
[52] U.S. Cl. ........................ 428/689; 428/690; 428/691; 428/696; 428/697; 428/702; 428/917; 250/483.1; 250/486.1; 252/301.4 H; 252/301.4 R; 313/503; 313/506; 313/509
[58] Field of Search .................................. 428/689, 690, 428/691, 917, 696, 697, 702; 252/301.4 H, 301.4 R, 483.1, 486.1; 313/503, 504, 505, 506, 507, 508, 509

[56] References Cited

U.S. PATENT DOCUMENTS

| | | | |
|---|---|---|---|
| 4,064,066 | 12/1977 | Toshinai | 252/301.4 H |
| 4,512,911 | 4/1985 | Kotera | 252/301.4 H |
| 4,720,436 | 1/1988 | Ohseto | 428/917 |
| 4,916,360 | 4/1990 | Mikami | 428/917 |
| 5,086,252 | 2/1992 | Kido | 252/301.4 H |

FOREIGN PATENT DOCUMENTS 3-187191  8/1991  Japan .

OTHER PUBLICATIONS

William, F., "Some New Aspects of Germanate and Fluoride Phosphors," *Journal of the Optical Society of America*, vol. 37, No. 4, New York (1947).

Crawford, J. et al., "Electronic Processes in Zinc Fluoride and in the Manganese–Activated Zinc Fluoride Phosphor," *The Journal of Chemical Physics*, vol. 18, No. 6, New York (1950).

Morton, D. et al., "A New Thin–Film Electroluminescent Material–$ZnF_2$:$Mn^a$," Appl. Phys. Lett. 35, vol. 9, New York (1979).

Miura, N. et al., "Strong Ultraviolet–Emitting $ZnF_2$:Gd Thin Film Electroluminescent Device," *Japanese Journal of Applied Physics*, vol. 30, No. 10B Oct. 1991, pp. L1815–L1816.

Miura, N. et al., "Electorluminescence of $ZnF_2$ Thin–Films Doped with Rare–Earth Ions," *Japanese Journal of Applied Physics*, vol. 31, Part I, No. 1, pp. 51–59, Jan. 1992.

Suyama, T. et al., "New Type of Thin–Film Electroluminescent Device Having a Multilayer Structure," *Appl. Phys. Lett.*, 41, vol. 5, Sep. 1982.

Japanese Abstract 03–187191.

Webster's Ninth New Collegiate Dictionary, Merriam–Webster Inc., p. 401 1990.

Condensed Chemical Dictionary, Van Nostrand Reinhold Company, p. 332 1971.

*Primary Examiner*—Ellis Robinson
*Assistant Examiner*—Timothy M. Speer
*Attorney, Agent, or Firm*—Oliff & Berridge

[57] ABSTRACT

An inorganic thin film EL device comprises, on an insulating substrate 1, a back electrode 2, an insulating layer 3, a light emission layer 4, an insulating layer 3, and a transparent electrode 5 formed on the substrate 1 in this order. The emission layer comprises lanthanum fluoride and at least one member selected from the group consisting of rare earth element metals and compounds thereof. The rare earth element is, for example, cerium, praseodymium, neodymium, samarium, europium, gadolinium, terbium, dysprosium, holmium, erbium, thulium, ytterbium and mixture thereof. The compounds maybe those compounds of the rare earth elements and fluorine, chlorine, bromine, iodine and oxygen. The rare earth element is preferably present in the emission layer in an amount of from 5 to 90 wt %.

21 Claims, 2 Drawing Sheets

INORGANIC THIN FILM ELECTROLUMINESCENT DEVICE HAVING A LIGHT EMISSION LAYER

This is a continuation of application Ser. No. 08/118,199 filed Sep. 9, 1993, now abandoned.

BACKGROUND OF THE INVENTION

1. Field of the Invention

This invention relates to electroluminescent devices and more particularly to inorganic thin film EL devices which are utilizable as a plane light source or a display device.

2. Description of the Prior Art

Attention has now been paid to applications of inorganic thin film EL devices as a flat panel display device or a plane light source. For this purpose, there have been used inorganic fluorescent materials which comprise a matrix selected from at least one of ZnS, CaS and SrS, which is doped with not larger than 3 atomic percent of at least one element selected from Mn, Tb, Sn, Ce, Eu, Sm, Tm and the like as an emission center (Japanese Laid-open Patent Application No. 3-187191).

Of these, ZnS:Mn has been studied for use as an orange light emission fluorescent material and has been utilized as a flat panel display device because of its good characteristics such as luminance, life and the like. Moreover, zinc sulfides have been widely studied including ZnS:Tb used as a green light emission fluorescent material. Other types of fluorescent materials using alkaline earth metal sulfide matrices have also been studied extensively, including SrS:Ce as a blue light emission fluorescent material, CaS:Eu as a red light emission fluorescent material, CaS:Ce as a green light emission fluorescent material, and the like. In view of the emission mechanism of fluorescent materials, with transition metals such as Mn, electrons of the matrix are directly collided with one another to emit a fluorescence. With alkaline earth metals, a large proportion of the light emission depends on the transition of an energy corresponding to the band gap of the matrix. The sulfides of alkaline earth metals have a band gap energy ranging from 4.3 to 4.4 eV and that of ZnS is 3.6 eV. In order to obtain blue to UV light emission requiring high energies, the band gap energy of these compounds is not so high. Thus, studies have been made on matrices having high band gap energies such as $ZnF_2$:Gd (7 to 8 eV), (J.J.A.P., Vol. 10B(1991), p. 1815–1816) and $CaF_2$:Eu (Appl. Phys. Lett., 41, 1982, p. 462).

Inorganic fluorescent materials using the above-indicated sulfides other than ZnS:Mn are not satisfactory for use as a flat panel display device and a plane light source with respect to emission luminance, efficiency and life. In this sense, working color flat panel display devices have never been formed at present.

SUMMARY OF THE INVENTION

It is accordingly an object of the invention to provide an inorganic thin film EL device which can solve the problems involved in the prior art and which is capable of full color display at a working level.

It is another object of the invention to provide an inorganic thin film EL device which comprises a light emission layer composed of lanthanum fluoride and a rare earth element or a compound thereof whereby the device is able to emit light which is higher in luminance, longer in life and wider in the wavelength range than known counterparts.

It is a further object of the invention to provide an inorganic thin film EL device which is conveniently utilizable as a plane light source such as for display devices.

We made studies on inorganic fluorescent materials which are adapted for full color inorganic thin film EL devices. As a result, we found that lanthanum fluoride permits rare earth elements or certain compounds thereof to be contained stably and exhibits a high band gap energy. More particularly, inorganic fluorescent materials having novel compositions which comprise combinations of lanthanum fluoride and rare earth elements or its compounds exhibit a high EL intensity. The invention is based on this finding.

More particularly, the above objects can be achieved, according to the invention, by an inorganic thin film EL device which comprises a light emission layer and a pair of electrodes at least one of which is optically transparent and which sandwich therebetween the light emission layer through an insulating layer formed on opposite sides of the light emission layer, the light emission layer consisting of lanthanum fluoride and at least one member selected from the group consisting of rare earth element metals and compounds thereof.

Of course, an insulating substrate may be provided to support one electrode thereon as will be described hereinafter.

DETAILED DESCRIPTION OF THE PREFERRED EMBODIMENTS

In the inorganic thin film EL device of the invention, the light emission layer comprises as essential components lanthanum fluoride and a rare earth element metal or its compound used as a emission center. The lanthanum fluoride serves to stabilize the rare earth element and has a band gap energy as high as 8 to 10 eV. The rare earth element serves as a donor when doped in the lanthanum fluoride and can increase the concentration of carriers.

In the practice of the invention, the rare earth element is doped in amounts larger than in known inorganic fluorescent materials, so that the carrier concentration in the matrix is increased, permitting the inorganic fluorescent material to emit light at a high luminance.

Examples of the rare earth element include cerium (Ce), praseodymium (Pr), neodium (Nd), samarium (Sm), europium (Eu), gadolinium (Gd), terbium (Tb), dysprosium (Dy), holmium (Ho), erbium (Er), thulium (Tm), ytterbium (Yb) and the like. These elements may be used singly or in combination.

The rare earth elements may be used as it is in the form of a metal, or may be in the form of compounds of the rare earth element and at least one element selected from fluorine, chloride, bromine, iodine and oxygen.

The rare earth element should preferably be present in the light emission layer in the range of from 5 to 90 wt % of the elemental metal or compound and the lanthanum fluoride should preferably be present in an amount of from 10 to 95 wt %.

The light emission layer is able to change the emitted light color from UV to IR light, depending on the type of rare earth element. For instance, UV light is obtained when gadolinium is added, blue light is obtained by addition of praseodymium, green light is obtained by addition of terbium, and orange light is obtained by addition of europium.

The emission layer is formed by press sintering light-emitting components consisting of lanthanum fluoride and a rare earth element or its compound to obtain a pellet or the emission layer may be formed or by press molding the light-emitting components to which a co-activator, e.g. a low melting metal such as, for example, gold, zinc or the like, is added to obtain a pellet. The thus-obtained pellet is used to form the emission layer by vacuum deposition techniques such as an electron beam vacuum deposition process, sputtering processes, CVD processes, MOCVD processes or the like. The thickness of the emission layer is preferably in the range of from 0.2 to 3.0 μm.

The inorganic thin film EL device of the invention should have an emission layer made of an inorganic fluorescent material and may be arranged in various forms.

Figure 1:
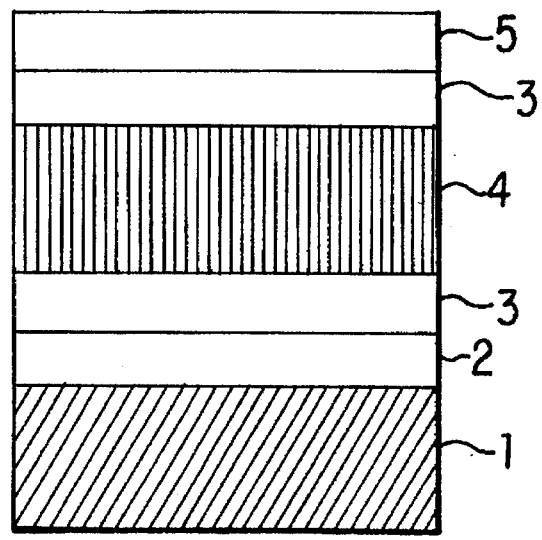
FIG. 1 is a schematic sectional view of an inorganic thin film EL device according to one embodiment of the invention illustrated in Example 1.
Figure 2:
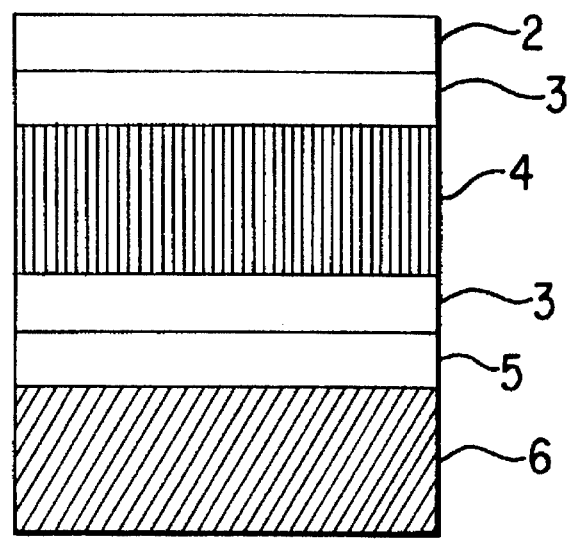
FIG. 2 is a schematic sectional view of an inorganic thin film EL device according to another embodiment of the invention illustrated in Examples 2 to 5.

Reference is now made to the accompanying drawings. FIG. 1 shows an inorganic thin film EL device which comprises, on an insulating substrate 1, a back electrode 2, an insulating layer 3, an emission layer 4, an insulating layer 3, and a transparent electrode 5 formed on the insulating substrate 1 in this order. FIG. 2 shows an EL device according to another embodiment of the invention which comprises, on a transparent substrate 6, a transparent electrode 5, an insulating layer 3, an emission layer 4, an insulating layer 3 and a back electrode 2 formed on the substrate 6 in this order. In the arrangement of FIG. 1, a semiconductor layer may be provided between the emission layer 4 and the insulating layer 3 at opposite sides of the layer 4. More particularly, FIG. 3 shows an EL device which comprises, on an insulating substrate 1, a back electrode 2, an insulating layer 3, a semiconductor layer 7, an emission layer 4, a semiconductor layer 7, an insulating layer 3, and a transparent electrode 5 formed on the substrate 1 in this order.

Figure 3:
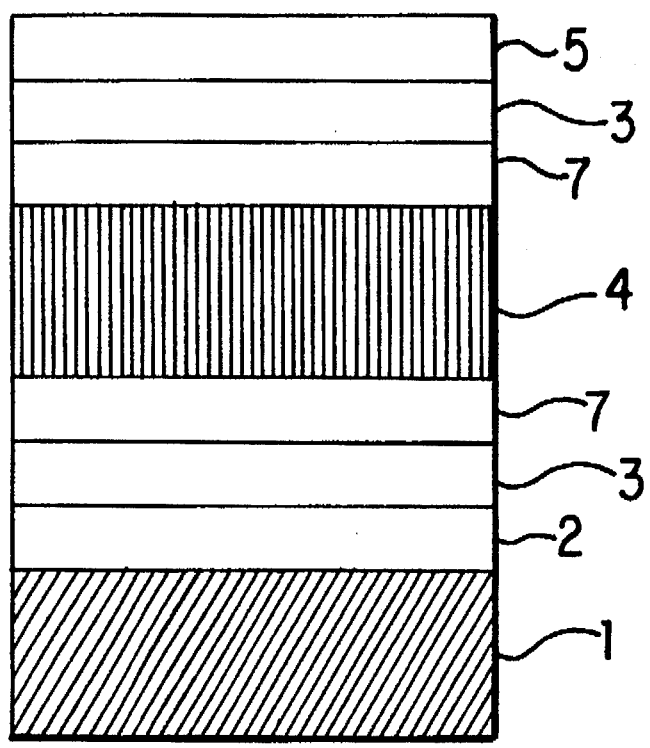
FIG. 3 is a schematic sectional view of an inorganic thin film EL device having semiconductor layers therein.

For fabricating these inorganic thin film EL devices, the respective layers are formed on the substrate in a similar manner as for the formation of the emission layer, thereby obtaining the EL devices having such structures as shown in FIGS. 1 to 3.

The substrate, electrodes and insulating layers of the EL devices may be, respectively, formed of known materials. For instance, the insulating layers may be made of $ZnF_2$, $CaF_2$, $MgF_2$, $SiN_x$, $TaO_x$, $Al_2O_3$, $Y_2O_3$, $PbTiO_3$ and the like. Each layer may have a double-layer structure. As a substrate, glass may be preferably used, and to prevent the diffusion of alkaline ions and the like from the glass substrate to the light emission layer, it is preferable to use a glass material free of alkaline ions. The above described insulating layer is made of an optically transparent material, and it is preferable to use an optically transparent material for an insulating layer.

In order to improve the luminance, the semiconductor layers shown in FIG. 3 may be formed as a carrier injection layer. The semiconductor used may be inorganic semiconductors including compounds of the elements of Groups II to VI of the periodic table such as hydrogenated amorphous silicon, CaS, MgS and the like, compounds of the elements of Groups II to VII of the periodic table such as HgI2, compounds of the elements of Groups III to V of the periodic table such as AlAs, GaN and the like, compounds of the elements of Groups IV to VI of the periodic table such as TiO2, SnO2 and the like, and compounds of the elements of Groups V to VI of the periodic table such as As2O3, Bi2O3 and the like, and organic semiconductors such as polyvinyl carbazole, TPD and the like.

The invention is more particularly described by way of examples.

EXAMPLE 1

This example illustrates an arrangement of FIG. 1.

10 wt % of gadolinium fluoride was mixed with 89 wt % of lanthanum fluoride, to which 1 wt % of gold was added as a co-activator, followed by press molding at 800 kg/cm² to provide a pellet for vacuum deposition.

Subsequently, ZnFx was vacuum deposited by means of an electron beam on a back electrode 2 formed on an insulating substrate 1 as shown in FIG. 1, thereby forming a 2000 angstroms thick insulating layer 3. Thereafter, the pellet was subjected to vacuum deposition with an electron beam to form a 7000 angstroms thick emission layer 4. In a similar manner, another insulating layer 3 was formed on the emission layer 4, on which a transparent electrode 5 made of ITO was vacuum deposited in a thickness of 1000 angstroms.

In this manner, an inorganic thin film EL device of the type shown in FIG. 1 was fabricated and subjected to measurement of light emission characteristics, revealing that UV light having a peak in the vicinity of 312 nm was emitted at an intensity of 0.01 mW/cm².

The arrangement of FIG. 2 is illustrated in Examples 2 to 5 which follow.

EXAMPLE 2

10 wt % of erbium fluoride was mixed with 90 wt % of lanthanum fluoride, followed by press sintering at 800 kg/cm² to obtain a pellet for vacuum deposition.

Subsequently, $CaF_2$ was vacuum deposited on a transparent electrode 5, which had been formed on a glass transparent substrate 6 and was made of ITO, in a thickness of 2000 angstroms by an electron beam, thereby forming an insulating layer 3. The pellet was vacuum deposited by means of an electron beam in a thickness of 7000 angstroms to form an emission layer 4. Another insulating layer 3 as formed on the emission layer in the same manner as set out above, followed by further vacuum deposition of a 1000 angstroms thick aluminium back electrode 2.

The resultant inorganic thin film EL device was subjected to measurement of emission characteristics, revealing that green light was emitted with an intensity of 0.01 mW/cm².

EXAMPLE 3

The general procedure of Example 2 was repeated except that 5 wt % of erbium fluoride and 95 wt % of lanthanum fluoride were used, thereby obtaining an inorganic thin film EL device. The device was able to emit green light with an intensity of 0.001 mW/cm².

EXAMPLE 4

The general procedure of Example 2 was repeated except that 50 wt % of erbium fluoride and 50 wt % of lanthanum fluoride were used, thereby obtaining an inorganic thin film EL device. The device was able to emit green light with an intensity of 0.006 mW/cm².

EXAMPLE 5

The general procedure of Example 2 was repeated except that 90 wt % of erbium fluoride and 10 wt % of lanthanum fluoride were used, thereby obtaining an inorganic thin film EL device. The device was able to emit green light with an intensity of 0.08 mW/cm².

What is claimed is:

1. An inorganic thin film electroluminescent device, comprising an inorganic light emission layer, a pair of electrodes and a pair of insulating layers, at least one of the electrodes being optically transparent, the light emission layer being positioned between the pair of insulating layers, each insulating layer being formed on an opposite side of the light emission layer, the pair of insulating layers being positioned between a light emission layer and the pair of electrodes, the light emission layer consisting essentially of inorganic material comprising a matrix of lanthanum fluoride doped with at least one member selected from the group consisting of rare earth element metals and compounds thereof.

2. The inorganic thin film electroluminescent device of claim 1, wherein said at least one member is present in said emission layer in an amount of from 5 to 90 wt %.

3. The inorganic thin film electroluminescent device of claim 1, wherein said at least one member is a rare earth element selected from the group consisting of cerium, praseodymium, neodium, samarium, europium, gadolinium, terbium, dysprosium, holmium, erbium, thulium, ytterbium and mixtures thereof.

4. The inorganic thin film electroluminescent of claim 1, wherein said at least one member is a compound of a rare earth element selected from the group consisting of compounds of said rare earth element and fluorine, chlorine, bromine, iodine, oxygen and mixtures thereof.

5. The inorganic thin film electroluminescent device of claim 1, further comprising an insulating substrate supporting an optically non-transparent electrode, said non-transparent electrode being one of the pair of electrodes.

6. The inorganic thin film electroluminescent device of claim 1, further comprising an optically transparent substrate supporting the optically transparent electrode.

7. The inorganic thin film electroluminescent device of claim 1, further comprising a pair of semiconductor layers, each semiconductor layer positioned between said emission layer and a corresponding one of said insulating layers.

8. The inorganic thin film electroluminescent device of claim 7, wherein each said semiconductor layer consists essentially of an inorganic semiconductor.

9. The inorganic thin film electroluminescent device of claim 7, wherein each said semiconductor layer consists essentially of an organic semiconductor.

10. The inorganic thin film electroluminescent device of claim 1, wherein the light emission layer further comprises a co-activator comprising a metal.

11. The inorganic thin film electroluminescent device of claim 10, wherein the co-activator is gold or zinc.

12. The inorganic thin film electroluminescent device of claim 1, wherein the light emission layer has a thickness of from 0.2 to 3.0 µm.

13. An inorganic thin film electroluminescent device, comprising an inorganic light emission layer consisting essentially of inorganic material comprising a matrix lanthanum fluoride doped with at least one member selected from the group consisting of rare earth element metals and compounds thereof.

14. The inorganic thin film electroluminescent device of claim 13, wherein said at least one member is present in said light emission layer in an amount of from 5 to 90 wt. %.

15. The inorganic thin film electroluminescent device of claim 13, wherein said at least one member is a rare earth element selected from the group consisting of cerium, praseodymium, neodium, samarium, europium, gadolinium, terbium, dysprosium, holmium, erbium, thulium, ytterbium and mixtures thereof.

16. The inorganic thin film electroluminescent device of claim 13, wherein said at least one member is a compound of a rare earth element selected from the group consisting of compounds of said rare earth element with fluorine, chlorine, bromine, iodine, or oxygen, and mixtures thereof.

17. The inorganic thin film electroluminescent device of claim 13, wherein said light emission layer consists essentially of said lanthanum fluoride, said at least one member, and, optionally, a coactivator.

18. The inorganic thin film electroluminescent device of claim 13, wherein at least one of said lanthanum fluoride and said at least one member are main components of the light emission layer.

19. The inorganic thin film electroluminescent device of claim 13, wherein said light emission layer comprises at least 10 wt. % lanthanum fluoride.

20. An inorganic thin film electroluminescent device, comprising an inorganic light emission layer comprising a host material of a lanthanum fluoride matrix and an emission center formed by doping said lanthanum fluoride matrix with at least one member selected from the group consisting of rare earth element metals and compounds thereof.

21. An inorganic thin film electroluminescent device, comprising an inorganic light emission layer, a pair of electrodes and a pair of insulating layers, at least one of the electrodes being optically transparent, the light emission layer being positioned between the pair of insulating layers, each insulating layer being formed on an opposite side of the light emission layer, the pair of insulating layers being positioned between a light emission layer and the pair of electrodes, the light emission layer comprising a matrix of lanthanum fluoride doped with at least one member selected from the group consisting of rare earth element metals and compounds thereof.

* * * * *